H. R. HUGHES.
ROTARY BORING DRILL.
APPLICATION FILED FEB. 24, 1914.
1,174,576.
Patented Mar. 7, 1916.
2 SHEETS—SHEET 1.
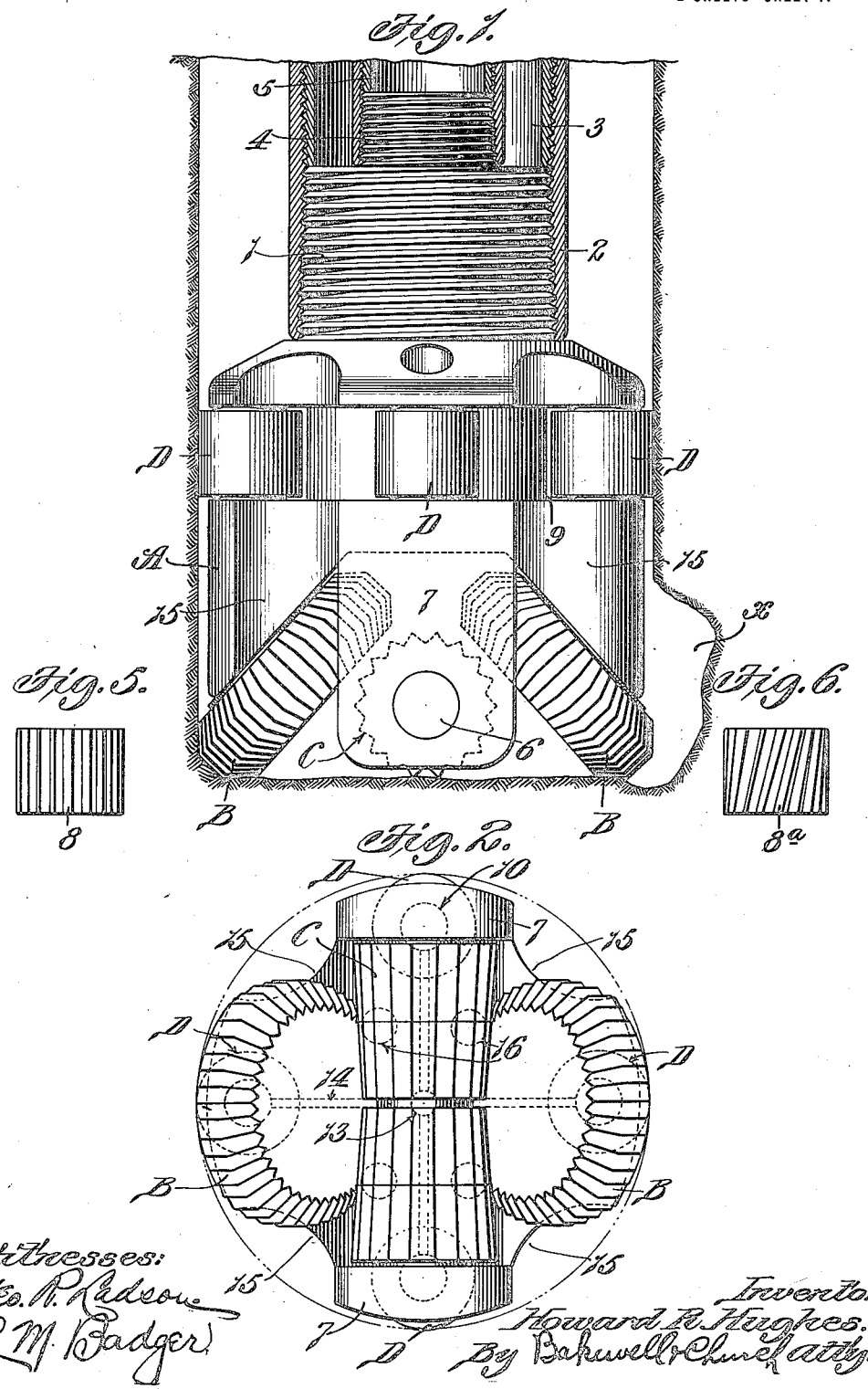

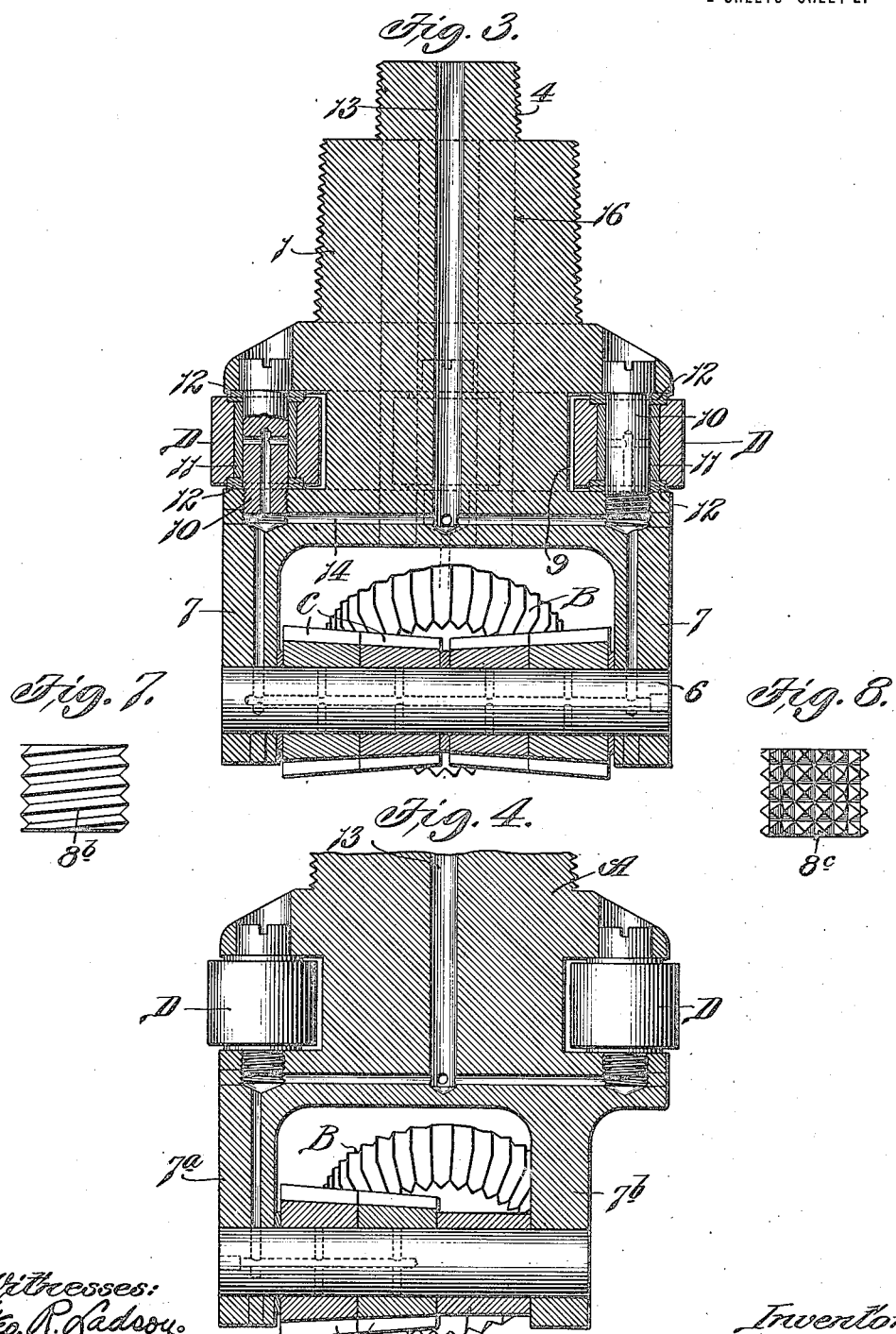

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY BORING-DRILL.

1,174,576.  Specification of Letters Patent.  Patented Mar. 7, 1916.

Application filed February 24, 1914. Serial No. 820,674.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type that are equipped with rotatable cutters, and particularly to drills that have inclined side cutters which revolve in planes converging in the head and a horizontally-disposed rotatable cutting device arranged between said inclined side cutters and extending diametrically across the head.

The main object of my present invention is to provide a rotary cutter drill which comprises means for preventing the head of the drill from canting or wabbling sidewise in the hole when the cutters encounter or come into alinement with a crevice in the side wall of the hole.

Another object is to provide a rotary boring drill of novel construction that consists of a one-piece head equipped with a pair of inclined rotatable side cutters arranged on opposite sides of a transversely disposed cutting device, and which is also provided with a plurality of horizontally-disposed rollers arranged at a point above said cutters for acting on the side wall of the hole.

Other objects and desirable features of my invention will be hereinafter pointed out.

Figure 1 of the drawings is a side elevational view of a drill constructed in accordance with my invention; Fig. 2 is a bottom plan view of said drill; Fig. 3 is a transverse sectional view of the drill; Fig. 4 is a transverse sectional view illustrating a slight modification of my invention; and Figs. 5 to 8, inclusive, are detail views illustrating various kinds of cutting surfaces that the horizontally-disposed steadying rollers on the head can be provided with.

Briefly described, my improved drill consists of a head provided with rotatable cutters that form a circular hole when the head is rotated, and means separate and distinct from said cutters which engages the side wall of the hole in such a manner that the head cannot wabble or move sidewise in the hole in case the cutters strike a crevice in the side wall of the hole. While I have herein illustrated my invention embodied in a drill that is provided with a pair of inclined side cutters arranged on opposite sides of a horizontally-disposed cutting device that extends transversely across the head, I do not wish it to be understood that my invention is limited to a drill of this particular construction as my broad idea consists in providing the head of a rotary cutter drill with means which of itself, and entirely independent of the cutters, holds the head straight at all times when the drill is in operation, and prevents the head from shifting laterally or from wabbling even when the cutters encounter a crevice in the side wall of the hole.

Referring to Fig. 1 of the drawings which illustrates the preferred form of my invention, A designates the head, preferably formed in one-piece, and provided at its upper end with a screw-threaded portion 1 for coöperating with a coupling sleeve 2 that secures the head to the drill stem 3, the head A also being provided with a screw-threaded boss 4 or some other suitable means for supporting a lubricant-holder 5. The cutting means of the drill consists of two inclined side rollers B which revolve in planes converging in the head, and a rotatable, horizontally-disposed cutting device that extends transversely across the head between the inclined side rollers B, said transversely-disposed cutting device preferably consisting of a plurality of small cutters C that are rotatably mounted on a horizontal shaft 6 whose end portions are supported in bearings 7 on the head A. The cutters C are preferably tapered, and are so arranged on the shaft 6 that they form a comparatively long cylindrical-shaped cutter which increases gradually in diameter from its center toward its opposite ends, and thus forms a substantially cone-shaped surface at the bottom of the hole which tends to center the drill head and prevent it from wabbling in the hole.

A plurality of horizontally-disposed rollers D are rotatably mounted in the head A at a point above the cutters B and C for engaging the side wall of the hole so as to hold the drill steady when it is in operation, even when the cutters on the head encounter or come into alinement with a crevice $x$ in the side wall of the hole. If it were not for the rollers D, the head of the drill would wabble or move laterally in the hole as soon as one of the side cutters B reached the crevice *x*, owing to the fact that said cutter would have nothing to work against to overcome the side thrusts produced by the action of the other side cutter on the side wall of the hole. Consequently, the rollers D insure the formation of a straight hole for said rollers bear against the side wall of the hole in such a manner that the head A is held perfectly straight when the drill is in operation. If the cutters B encounter a small crevice *x* in the side wall of the hole they will travel past said crevice without entering same, due to the fact that the rollers D are bearing against a cylindrical portion of the side wall of the hole located above said crevice *x*. While the chief function of the rollers D is to steady the head and prevent it from wabbling, said rollers can also be utilized to keep the gage of the hole uniform and maintain a sufficient clearance for the drill. When the rollers D are used for this purpose as well as to steady the head, they are provided with cutting surfaces of some suitable type which shear off the material at the side of the hole; or, in other words, ream the side wall of the hole. The particular type of cutting surfaces the rollers D are provided with is immaterial so far as my invention is concerned, and in Figs. 5 to 8 of the drawings I have illustrated various kinds of cutting surfaces all of which are efficient, the one shown in Fig. 5 consisting of straight chisel-teeth 8, the one in Fig. 6 consisting of inclined chisel-teeth $8^a$, the one in Fig. 7 consisting of a spiral tooth $8^b$, and the one in Fig. 8 consisting of sharp-pointed projections $8^c$. The rollers D can either be set in small pockets formed in the outer surface of the head A, or an annular groove 9 can be formed in the head to receive the rollers D, the latter construction being preferably on account of the low cost of manufacture. As shown in Fig. 3, each of the rollers D is rotatably mounted on a spindle 10 whose upper end portion is seated in the part of the head that forms the top wall of the annular groove 9, and whose lower end portion is screwed into the bottom wall of said annular groove, said spindle being preferably provided with a bushing 11 on which the roller is rotatably mounted, and washers 12 that bear against the top and bottom faces of the roller.

The cutters and the rollers D are kept thoroughly lubricated by means of a lubricating medium which is supplied continuously to the bearings of said cutters and rollers through a main lubricating duct 13 that leads from the lubricant-holder 5 to branch ducts 14 in the head which lead to distributing ducts in the spindles and shafts on which the cutters and rollers are mounted, as indicated in broken lines in Fig. 3.

While I prefer to equip the drill with a horizontally-disposed cutting device that extends transversely across the head, as shown in Fig. 3, it is not absolutely essential to the successful operation of the drill that said cutting device extend clear across the head, for, if desired, said device could extend only part way across the head, as shown in Fig. 4, wherein the reference character $7^a$ designates a bearing at one side of the head which supports the outer end of the supporting shaft 6 for the cutters C, and the reference character $7^b$ designates a bearing for the opposite end of said shaft that is located adjacent the center of the head, a short sleeve $7^c$ being arranged on said shaft between the bearing $7^b$ and the inner cutter C so as to prevent said cutters from moving longitudinally of the shaft 6. At suitable points in the side of the head vertically-disposed grooves or channels 15 are formed, as shown in Figs. 1 and 2, so as to provide ample clearance for the disintegrated material that is flushed out of the hole by the wash-water which is pumped down through the drill stem and through the water-courses 16 in the head, shown in broken lines in Figs. 2 and 3. While I prefer to provide the drill with four rollers D arranged equal distances from each other around the head, as shown in Fig. 2, I do not wish it to be understood that my invention is limited to a drill having this particular number and arrangement of steadying rollers for the same result could be accomplished in various other ways without departing from the spirit of my invention.

Having thus described my invention, what I claim as new and desire to secure by Letters Patent is:

A rotary drill consisting of a head, a pair of inclined side cutters which revolve in planes that converge in the head, a horizontally-disposed rotatable cutting device arranged between said inclined side cutters, horizontally-disposed rollers arranged in said head at a point above said cutters which act on the side wall of the hole, a lubricant holder and means for supplying the lubricant in said holder to the bearings of said cutters, said cutting device and said rollers.

In testimony whereof I hereunto affix my signature in the presence of two witnesses, this 16" day of February, 1914.

HOWARD R. HUGHES

Witnesses:
L. A. GODBOLD,
C. E. REED.